US011123765B2

(12) United States Patent
Scheffler et al.

(10) Patent No.: US 11,123,765 B2
(45) Date of Patent: Sep. 21, 2021

(54) GRANULATED SEEDS

(71) Applicant: Evonik Operations GmbH, Essen (DE)

(72) Inventors: Jochen Scheffler, Hoesbach (DE); Beata Maria Lortz, Waechtersbach (DE); Thomas Rieger, Gelnhausen (DE); Ludger Alpmann, Lippstadt (DE); Ulf Feuerstein, Assendorf b. Bruchhausen-Vilsen (DE); Joern Dau, Eschwege (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 14/893,836

(22) PCT Filed: May 20, 2014

(86) PCT No.: PCT/EP2014/060277
§ 371 (c)(1),
(2) Date: Nov. 24, 2015

(87) PCT Pub. No.: WO2014/195123
PCT Pub. Date: Dec. 11, 2014

(65) Prior Publication Data
US 2016/0151805 A1   Jun. 2, 2016

(30) Foreign Application Priority Data
Jun. 5, 2013   (DE) ............... 10 2013 210 408.1

(51) Int. Cl.
*B05D 7/00* (2006.01)
*A01C 1/06* (2006.01)

(52) U.S. Cl.
CPC . *B05D 7/58* (2013.01); *A01C 1/06* (2013.01)

(58) Field of Classification Search
None
See application file for complete search history.

(56) References Cited

U.S. PATENT DOCUMENTS

| | | | |
|---|---|---|---|
| 6,156,699 A | 12/2000 | Johnson et al. | |
| 6,383,280 B1 | 5/2002 | Siray et al. | |
| 6,395,247 B1 | 5/2002 | Siray et al. | |
| 8,524,284 B2 | 9/2013 | Lortz et al. | |
| 2010/0154299 A1 | 6/2010 | Kobayashi et al. | |

FOREIGN PATENT DOCUMENTS

| | | | | |
|---|---|---|---|---|
| CN | 1480019 A | 3/2004 | | |
| CN | 101360697 A | 2/2009 | | |
| DE | 34 39 932 A1 | 6/1985 | | |
| DE | 102 59 197 A1 | 7/2004 | | |
| DE | 102004040726 A1 * | 2/2006 | ............... | A01C 1/06 |
| EP | 0 097 459 A1 | 1/1984 | | |
| EP | 0353431 A2 * | 2/1990 | ............... | A01C 1/06 |
| EP | 0 353 431 B1 | 9/1993 | | |
| EP | 1 935 245 A1 | 6/2008 | | |
| GB | 668333 A * | 3/1952 | ............... | A01C 1/00 |
| JP | 59-2683 | 1/1984 | | |
| JP | 60-145005 | 7/1985 | | |
| JP | 05-192011 | 8/1993 | | |
| JP | 06-113618 | 4/1994 | | |
| JP | 2676394 B2 | 11/1997 | | |
| JP | 2012-044912 | 3/2012 | | |
| JP | 2012-521989 A | 9/2012 | | |
| JP | 2013-503629 A | 2/2013 | | |

OTHER PUBLICATIONS

Kopral et al., Investigation of Classifying Tomato Seeds in Drum Screen, CHEMIK, 65.4 (2011): 359-364.*
Tuomela, M., et al. "Biodegradation of lignin in a compost environment: a review." Bioresource Technology 72.2 (2000): 169-183.*
Online MSDS for CAB-O-SIL M5, retrieved from the internet on Aug. 19, 2019 from URL< http://www.whiteformula.com/WhiteFormula_UK/Materials_files/fumed_silica_info.pdf>.*
International Search Report Issued for PCT/EP14/60277 Filed May 20, 2014.
German Search Report dated Mar. 31, 2014 for 10 2013 210 408.1 Filed Jun. 5, 2013 (with Translation of Category of Cited Documents).
Combined Chinese Office Action and Search Report dated Nov. 18, 2016 in Chinese Patent Application No. 201480032082.6 (with English translation of categories of cited documents).

* cited by examiner

*Primary Examiner* — Alton N Pryor
(74) *Attorney, Agent, or Firm* — Oblon, McClelland, Maier & Neustadt, L.L.P.

(57) ABSTRACT

The invention relates to a process for the production of granulated seed comprising seed kernels which are coated with a coating layer, the process comprising the following steps: providing seed kernels, applying a binder to the seed kernels, giving rise to seed kernels coated with a binder, and applying a coating composition comprising silica to the seed kernels coated with binder, giving rise to seed kernels coated with a coating layer. The invention furthermore relates to the use of silica as component of the coating layer of granulated seed for improving the germination ability of the seed. The invention furthermore relates to granulated seed, comprising seed kernels coated with a coating layer, characterized in that the coating layer comprises silica and that the silica is distributed within the entire coating layer.

19 Claims, 5 Drawing Sheets

GRANULATED SEEDS

The present invention relates to granulated seed which comprises seed kernels which are coated with a silica-containing coating layer. The silica-containing coating layer has moisture-regulating properties, whereby the germination ability of the seed is retained even under especially dry conditions. The present invention furthermore relates to a process for granulating seed. The process according to the invention is particularly suitable for the granulation of seed kernels with a size of approximately 0.3 to 10 mm.

The present invention relates to granulated seed. Hereinbelow, this term refers to seed whose seed kernels are coated with a coating layer of organic and/or inorganic material. The advantage of granulated seed over ungranulated seed is that it is composed of particles of approximately the same shape and size and has a relatively uniform density. These properties are very advantageous for example for mechanical sowing:
- it makes possible and/or simplifies the utilization of precision seeding,
- the amount of seed required can be optimized and, as a rule, be reduced, and
- at the same time, the yield per cropping area can be maximized.

As a rule, granulated seed contains a carrier material which coats the seed kernels. The moisture content of the seed can be controlled by selecting a suitable carrier material. This serves, firstly, to protect the seed from spoilage; secondly, it allows prevention of the drying-out of the seed and thus retention of its germination ability. Controlling the moisture content is in addition and in particular of importance during sowing under especially dry conditions because the water present in the silica will be released.

U.S. Pat. No. 6,156,699 discloses granulating seed, in particular lucerne seeds, using polyvinyl alcohol as the binder, phyllosilicate as carrier material and silica gel as granulating aid. The granules are prepared by adding a dispersion of binder and carrier material to the seeds, whereby the seed kernels are coated by a carrier material layer. To these granules there is added, in a second step, silica gel or silica so as to prevent the granules from sticking to each other.

EP 0 013 769 A1 describes a process of granulating seed, for example of maize or sugarbeet, using vermiculite as the carrier material. This carrier material is highly gas- and liquid-permeable, and it is said that this creates equally good growth conditions for the seed under different biological conditions.

EP 0 543 438 A1 describes the pelleting of genetic material, for example fungal spores, using polyvinyl alcohol as the binder and using a solid carrier substance, for example vermiculite.

EP 0 380 448 A1 describes the production of pelleted seed, for example pelleted grass seed, where a variety of organic or inorganic substances are proposed as carrier material, for example argillaceous earth or compost. The pelleted seed is granulated with the aid of binders and can be treated with water-retention agents, for example starch-modified polyacrylic acids, so as to regulate the pelleted seed's water balance. According to EP 0 380 448 A1, a mixture of carrier material, binder and water-retention agent is first prepared for the granulation process. This mixture is subsequently compressed onto the seed so as to produce granules.

WO 00/35277 discloses the production of seed with an insecticidal coating layer. The coating layer described is a composition of a binder, an insecticide and a filler, with diatomaceous earth being an example of a filler employed.

JP 2003-325006 A also discloses the production of granulated rice seeds, where the coating layer contains cellulose as the main component. The coating layer described can additionally contain silica gel or diatomaceous earth by way of additive.

It is an aim of the present invention to provide a process for the production of granulated seed, the granulated seed preserving a high degree of germination ability. It is intended that the germination ability of the granulated seed even three days after watering should correspond largely to the original germination ability prior to granulation, even after storage for several months. It is intended to avoid phytotoxic effects on the seed by choosing a suitable carrier material, and to stabilize and increase the germination ability and field emergence rate, in particular under dry culture conditions. The seed granules produced are intended to be distinguished by a high degree of hardness and abrasion resistance so as to ensure, and improve, the storage ability and transportability. A further aim of the present invention is to provide granulated seed which can preferably be prepared by the process mentioned and which has the above-described properties. In particular, the process is intended to make possible the granulation of seed kernels with a size of approximately 0.3 to 10 mm.

This aim is achieved by a process for the production of granulated seed, in other words coated seed kernels, comprising seed kernels which are coated with a coating layer, the process comprising the following steps:
a) providing seed kernels,
b) applying a binder to the seed kernels, giving rise to seed kernels coated with a binder,
c) applying a coating composition comprising silica to the seed kernels coated with binder, giving rise to seed kernels coated with a coating layer, and
d) optionally drying the seed kernels coated with binder and coating composition.

The coating composition to be employed in accordance with the invention is a mixture in which the silica is preferably distributed uniformly. Preferably, the coating composition is a mixture of solids.

The silica is employed in a suitable amount so that the coating layer contains preferably 10 to 70% by weight, especially preferably more than 15 and less than 50% by weight and most preferably 20 to 45% by weight of silica, based on the total weight of the coating layer.

Silica for the purposes of the present invention is polysilicic acid, which is present in the form of individual particles which are hydroxylated on their surface and which are not crosslinked with each other. It is known that polysilicic acids are condensates of monosilicic acid $Si(OH)_4$.

The silica typically used within the scope of the present invention is industrially obtained silica, preferably precipitated silica and/or pyrogenic silica.

In contrast to silica, kieselguhr or diatomaceous earth is not required and is preferably not present in the coating layer, not even as a filler or the like.

The silica preferably has a BET surface area in accordance with ISO 9277 of from 20 to 400 $m^2/g$, preferably from 50 to 300 $m^2/g$.

The silica preferably has a d50 particle size in accordance with ISO 13320-1 of from 5 to 130 μm, preferably from 10 to 120 μm and especially preferably from 15 to 110 μm.

The silica preferably has a pore size distribution maximum (pore maximum) in accordance with DIN 66134 at a pore size of from 30 to 60 nm, preferably of from 35 to 50 nm.

Silicas according to the invention are obtainable for example under the trade names SIPERNAT® and AEROPERL®.

The process according to the invention ensures a uniform distribution of the silica in the coating composition and permits the production of granulated seed with a high proportion of silica in the coating composition, where both the uniform distribution and the high silica content promote the regulation of the seed moisture during storage and transport and the providing of the seed with moisture post-sowing.

The binder is preferably applied in liquid form, for example either in the form of a binder which is liquid per se or in the form of a liquid composition containing a binder. The liquid composition containing a binder may, for example, be a solution of a binder in a solvent where the binder per se is solid. It is also possible to use a composition of a binder in a solvent where the binder per se is liquid. It is also possible to admix the binder in pulverulent form to the coating composition and to use water without further additions as the liquid component. The latter variant may replace the above-described steps b) and c). In this case, such a step bc) would be applying of, to the seed kernels provided, a coating composition comprising silica, binder and optionally water, giving rise to seed kernels coated with a coating layer.

The result of the separate addition of the binder, which is preferably liquid, or of the liquid composition containing a binder, on the one hand, and the coating composition on the other hand is that the seed is first wetted as uniformly and fully as possible by the binder before the coating composition is added. In this context, the seed kernels are essentially coated individually and completely so that essentially each kernel of the granulated seed contains a single seed kernel. Moreover, the liquid binder composition has the advantage that it can be applied uniformly by spraying.

The liquid binder may, for example, be a solution, emulsion, suspension or slurry. By preference, the binder/binder composition is a binder which is liquid per se, a single-phase solution of a binder or a multi-phase liquid mixture which contains a liquid binder and does not include any solid-phase constituents. A binder composition will typically contain the binder and a solvent such as, for example, water. In the case of a binder composition, the binder concentration in the composition amounts to preferably 0.1 to 10% by weight, especially preferably 3 to 6% by weight, based on the weight of the composition.

Preferably suitable as binders are water-soluble or water-dispersible polymers or mixtures of such polymers. The binder should be chemically degradable or biodegradable in the soil so as to allow germination. Examples of suitable polymers are polyvinyl alcohol, polycarboxylates, polyacrylic acid, polysaccharides, cellulose, cellulose derivatives, carboxymethylcellulose, acrylic dispersions, polymethyl acrylates, polyvinyl acetate, polyethylene oxide, alkyl acrylates, gelatin, starch, alginates, casein, molasses, pectin or any mixtures of these.

The binder especially preferably comprises polyvinyl alcohol since it has emerged that the use of polyvinyl alcohol as the binder has a positive effect on the hardness and abrasion resistance of the seed granules, in particular in the case of rapeseed.

The process is preferably carried out in a rotating pan-shaped container. The container is preferably inclined, especially preferably at an angle of 45°. The rotation speed of the container is preferably from 200 to 400 rpm.

The seeds are preferably mixed with the binder in such a way that the seed is first introduced into the container and subsequently sprayed with the liquid binder/the liquid composition containing a binder. With rotation of the container, a mixture of seed kernels which adhere to each other is formed in this process. Thereafter, the coating composition is added, with rotation of the container, during which process the desired granules are formed.

The sequence of steps b) and/or c) can optionally be repeated as often as desired, where the composition of the binder and/or the coating composition may in each case be different from the composition used in the previous steps. It is possible thereby to produce granulated seed with a thicker coating layer. In this context, the term coating layer always refers to the entire coating layer comprising binder and coating compositions.

It is preferred to add such an amount of liquid binder or liquid composition containing a binder and coating composition, based on the weight of the seed kernels provided, that the weight of the granulated seed amounts to 150 to 1000%, preferably 200 to 500%. The amount of binder (liquid component) is determined above all by the amount of liquids which the coating composition takes up, and at what rate. The ratio of coating composition to binder can be approximately in the range of from 1:0.5 to 1:2.

In practice, one will have to differentiate whether a specific dimension is to be achieved by the granulation process or whether a defined increase in weight is to be achieved, as is customary in the market for example when pelleting grass seed. In the first case, the mixing ratio of seed to coating composition depends on the desired target dimension and the increase in weight can amount to up to 1000%, depending on the type of seed. In the case of dimension-independent increases in weight, the increase in weight to be achieved will depend on factors such as client specification, market requirements and the type of seed.

In a further embodiment, it is possible to add, together with the coating composition, hygroscopic salts in such an amount that the coating layer comprises 0.1 to 15% by weight, preferably 0.2 to 10% by weight, especially preferably 0.3 to 7% by weight, of hygroscopic salts.

The hygroscopic salt can have an additional positive effect on the ability of the coating layer to store moisture. Examples of suitable hygroscopic salts are magnesium chloride, magnesium nitrate, magnesium sulphate, ammonium nitrate, ammonium chloride, ammonium sulphate, potassium chloride, zinc sulphate, potassium nitrate, ammonium dihydrogensulphate, sodium dihydrogensulphate, potassium sulphate, sodium nitrate, calcium chloride or any mixtures of these. Especially preferred are magnesium chloride, magnesium nitrate, magnesium sulphate or any mixtures of these.

In a further embodiment, suitable organic and/or inorganic fillers may additionally be added to the coating composition, for example polysaccharides such as cellulose or hemicellulose, wood fibres, lignin, charcoal, peat meal, wood dust, gypsum, mica, sand, bentonite, natural silicates or any mixtures of these. The additional fillers contribute to the hardening process and therefore to the mechanical stability of the granules.

To further influence the uptake of moisture, one or more swelling agents can be added, to at least one of the coating compositions to be applied, in such an amount that the coating layer comprises from 0.1 to 25% by weight, especially preferably from 1 to 5% by weight, of a swelling agent.

Examples of suitable swelling agents are phyllosilicates. Examples of suitable phyllosilicates are clay minerals, talcum, serpentine, vermiculite, bentonite, muscovite, kaolinite or any mixtures of these. The coating layer can comprise from 0.1 to 25% by weight, preferably from 1 to 5% by weight, of a swelling agent. The coating layer especially preferably comprises sodium bentonite, in particular in the case of granulated rapeseed. This is because it has emerged that the addition of sodium betonite has a positive effect on the germination ability of granulated rapeseed.

Fungicides, insecticides, biocides, plant strengthening agents, nutrient or phytohormones may additionally be added to the coating composition. These substances can be added in liquid or solid form to the coating composition. These substances can also be added to the coating composition as late as during the granulation process. These substances protect the seed from attack by pests, promote germination and field emergence and/or contribute to supplying nutrients to the seed.

The process according to the invention is preferably suitable for granulating seeds of useful plants. Examples of suitable types of seeds are seeds of various leafy vegetables such as, for example, lettuce (*Lactuca sativa L.*), chicory (*Cichorium intybus var foliosum*), endive (*Cichorium endivia L.*), rocket (*Dip/otaxis tenuifolia*), Swiss chard (*Beta vulgaris*), spinach (*Spinacia oleracea L.*); seeds of Brassicaceae such as, for example, cabbages (*Brassica* sp.), oilseed rape (*Brassica napus*), turnip rape (*Brassica rapa L.*), oil radish (Raphanus sativus), radish (*Raphanus sativus L.*), mustard (*Sinapis alba*), linseed (*Linum usitassimum* Linacaceae), gold-of-pleasure (*Camelina sativa*); seeds of Cucurbitaceae such as, for example, cucumbers (*Cucumis L.*), pumpkins or courgettes (*Cucubita*), tomato (*Solanum lycopersicum*), aubergine (*Solanum melongena*), avocado (*Persea americana Mill.*); seeds of various root vegetables such as, for example, carrot (*Daucus carota L.*), beetroot (*Beta vulgaris* subsp. *vulgaris*), sugarbeet (*Beta vulgaris* subsp. *vulgaris, altissima* group), horseradish (*Aromoracia rusticana*); seeds of Alliaceae (*Allium* sp.) such as, for example, onion (*Allium cepa* L.), leeks (*Allium porrum* L.), garlic (*Allium sativum* L.); seeds of legumes such as, for example, peas (*Pisum sativum* L.), vetches (*Vicia sativa* L.), lentils (*Lens*), soybeans (*Glycine max* (L.) Merr.); seeds of Leguminosae such as, for example, white clover (*Trifolium repens* L.), red clover (*Trifolium pratensis* L.), Egyptian clover (*Trifolium alexandrinum* L.), Italian clover (*Trifolium incarnatum* L.), Persian clover (*Trifolium resupinatum*) bird's foot trefoil (*Lotus comiculatus*) and lucerne (*Medicago sativa*); grasses (Cyperaceae, Poaceae); seeds of catch crops such as, for example, phacelia (*Phacelia tanacetifolia*); seeds of various cereals such as, for example, wheat (*Triticum aestivum L.*), rye (*Secale cereale* L.), barley (*Hordeum* sp.), oat (*Avena sativa*), rice (*Oryza*), maize (*Zea mays*), sorghum and millet (*Sorghum* sp., *Panicum* sp, *Pennisetum* sp.); seeds of ornamentals such as, for example, *Tagetes* sp., begonias (*Begonia*), lobelias, (*Lobelia*), pelargoniums (*Pelargonium*), fuchsias (*Fuchsia cultivars*), petunias (*Petunia* sp.), pinks (*Dianthus* sp.), fan-flowers (*Scaevola aemula*), sunflower (*Helianthus* sp.); and seeds of tobacco (*Nicotiana tabacum*).

It is especially preferred to use seeds of Brassicaceae, most preferably oilseed rape seeds and/or mustard seeds.

It is preferred to use seed kernels with a kernel size of from 0.3 to 10 mm. The seed-kernel size can be determined for example by screening. As regards selected types of seeds, the seed-kernel size is defined as a range and the mean seed-kernel size as follows. The data shown are from the Handbuch Saatgutaufbereitung [Seed Processing Manual] (M. Kruse, Handbuch Saatgutaufbereitung, 2008, Agrimedia GmbH, pages 12 et seq.).

| Type of seed | Seed-kernel size (mm) | Mean seed-kernel size (mm) |
|---|---|---|
| *Aestivum* wheat | 2.4-3.2 | 2.8 |
| *Durum* wheat | 2.0-3.2 | 2.6 |
| Spelt | 2.5-3.0 | 2.75 |
| Barley | 1.9-2.5 | 2.2 |
| Rye | 2.1-2.8 | 2.45 |
| Oat | 2.0-3.5 | 2.75 |
| Triticale | 2.5-3.0 | 2.75 |
| Maize | 4.0-7.0 | 5.5 |
| Pea | 5.5-9.0 | 7.25 |
| Faba bean | 6.2-7.7 | 6.95 |
| White lupin | 5.5-9.3 | 7.4 |
| Yellow lupin | 2.5-4.5 | 3.5 |
| Blue lupin | 4.2-5.9 | 5.05 |
| Oilseed rape | 1.6-2.3 | 1.95 |
| Sunflower | 3.0-5.0 | 4.0 |
| Linseed | 0.8-1.4 | 1.1 |
| Ryegrasses | 0.5-0.9 | 0.7 |
| Meadow fescue | 0.5-0.8 | 0.65 |
| Red fescue | 0.3-0.7 | 0.5 |
| Timothy | 0.6-0.9 | 0.75 |
| Red clover | 1.0-1.3 | 1.15 |
| White clover | 0.7-0.8 | 0.75 |
| Lucerne | 0.8-1.0 | 0.9 |
| Carrot | 0.8-1.0 | 0.9 |
| Onion | 1.2-2.0 | 1.6 |
| Cabbages | 1.2-2.5 | 1.85 |
| Parsley | 1.0-1.5 | 1.25 |
| Lettuce | 0.4-0.6 | 0.5 |

It is preferred after step c) to dry the seed kernels which are coated with binder and coating composition. The granulated seed is preferably dried at a temperature higher than room temperature, but not unduly high. Drying is preferably effected at a temperature in the range of from 25 to 50° C., especially in the range of from 35 to 45° C., most preferably in the range from 35 to 40° C. In the case of rapeseed, for example, it has emerged that the germination ability of the granulated seed is retained best at a drying temperature in the range of from 25 to 40° C.

In a preferred embodiment of the process, the coated seed kernels with different kernel sizes which are obtained in step c) are separated into kernel-size ranges before they are dried. This is preferably carried out by screening, and it is preferred to use two screens with different mesh sizes so as to select a specific kernel-size range. The fraction with a smaller kernel size than the desired size can be returned to the mixture in step a) so as to be retreated with binder composition and coating composition and to increase the kernel size.

It is especially preferred to separate the mixture of coated seed kernels such that coated seed kernels are obtained which are within a narrow kernel-size range which comprises, for example, kernel sizes in a range of 1.25-fold to 5-fold, preferably 1.5-fold to 2.5-fold the mean seed-kernel size. In the case of granulated rapeseed, the preferred kernel-size range is 2.0 to 3.6 mm, especially preferably 2.0 to 3.0 mm.

The present invention furthermore relates to the use of silica as component of the coating layer of granulated seed for improving the germination ability of the seed. In this context, the silica which has already been described is employed. The use of silica for improving the germination ability of granulated rapeseed has proved to be especially suitable in this context.

In an especially preferred embodiment, the invention relates to the use of precipitated or pyrogenic silica which has a BET surface area in accordance with ISO 9277 of from 20 to 400 m$^2$/g, preferably 50 to 300 m$^2$/g and/or a d50 particle size in accordance with ISO 13320-1 of from 5 to 130 μm, preferably 10 to 120 μm, especially preferably 15 to 110 μm, and/or a pore maximum in accordance with DIN 66134 of from 30 to 60 nm, preferably 35 to 50 nm.

It is further more preferred to employ the silica in such an amount that its content of the total weight of the coating layer amounts to 10 to 70% by weight, preferably more than 15 and less than 50% by weight, most preferably 20 to 45% by weight.

For the purposes of the present invention, a stabilization and improvement of the germination ability is observed from a stabilized and increased germination ability of granulated seed which contains silica in the coating layer in comparison with a granulated seed which does not contain any silica in the coating layer, but has a coating layer with an otherwise identical composition.

The present invention furthermore relates to granulated seed which comprises seed kernels coated with a coating layer and which is characterized in that the coating layer comprises silica and that the silica is distributed within the entire coating layer.

The silica is an above-described silica according to the invention.

The silica is considered to be distributed within all of the coating layer if it is not only concentrated within a delineated zone of the coating layer, for example on the surface of the coating layer, but if the silica can be found distributed over the entire thickness of the coating layer.

The silica is preferably distributed uniformly within all of the coating layer. In an especially preferred embodiment, the silica is considered to be uniformly distributed if the difference between the silica concentration in the inner part of the coating layer and the silica concentration in the outer part of the coating layer amounts to not more than 50% by weight, preferably not more than 35% by weight, especially preferably not more than 15% by weight. Inner and outer part of the coating layer result from the division of the coating layer into two equally thick shells. The inner part of the coating layer is formed by the shell lying directly on the seed kernel and enclosing it. The outer part consists of the shell which lies on the outside and encloses the inner shell.

The present invention relates in particular to granulated seed in whose production a silica according to the invention is employed.

The seed according to the invention is especially preferably prepared by the above-described process according to the invention.

The coating layer contains preferably 10 to 70% by weight of silica, especially preferably more than 15 and less than 50% by weight, most preferably 20 to 45% by weight, based on the weight of the coating layer.

The result of using silica according to the invention and the fact that the silica is distributed within all of the coating layer is that the granulated seed is better at storing moisture. This ensures the germination ability of the seed even under dry conditions. According to the invention, therefore, the silica does not act as a separating agent, which facilitates the granulation of coated seeds, but as a moisture-regulating agent and as a filler. In addition, the silica serves to stabilize and increase the germination ability in comparison with granulated seed which does not contain any silica in the coating layer.

Kieselguhr or diatomaceous earth is not required in the seed according to the invention. Kieselguhr or diatomaceous earth can be detected in the seed from its morphology and distinguished from the silica used in accordance with the invention, which is usually obtained industrially.

Preferably, the seed kernels are essentially coated individually and completely so that essentially each kernel of the granulated seed contains a single seed kernel.

As a rule, the coating layer comprises a binder, preferably one of the abovementioned binders.

In addition, the coating layer may comprise a hygroscopic salt, preferably one of the abovementioned hygroscopic salts.

In addition, the coating layer may comprise organic and/or inorganic fillers, preferably one of the abovementioned fillers.

To further influence the uptake of moisture, the coating layer can additionally comprise swelling agents, preferably one of the abovementioned swelling agents.

Furthermore, the coating layer can comprise fungicides, insecticides, biocides, plant-strengthening agents, nutrient or phytohormones.

The seed is preferably selected from among the abovementioned types of seeds.

The granulated seed can have different kernel-size ranges (dimensions). The granulated seed especially preferably has a narrow kernel-size range which comprises kernel sizes in the range of 1.25-fold to 5-fold, preferably 1.5-fold to 2.5-fold the mean seed-kernel size. In the case of rapeseed, the kernel size of the granulated seed is preferably from 2.0 to 3.6 mm, especially preferably the range is 2.0 to 3.0 mm.

The seed according to the invention preferably has a granule hardness of at least 1.4 kg, preferably at least 1.5 kg, especially preferably at least 1.8 kg.

It has emerged that the seed according to the invention has outstanding storability and, in contrast to non-granulated seed, also has outstanding germination ability, even after more than one year's storage. The root density of the plants, when using granulated seed according to the invention, is increased in comparison with non-granulated seed. Likewise, the use of granulated seed according to the invention results in an increased yield, for which a lower planting density is required in comparison with non-granulated seed.

EXAMPLES

Figure 1:
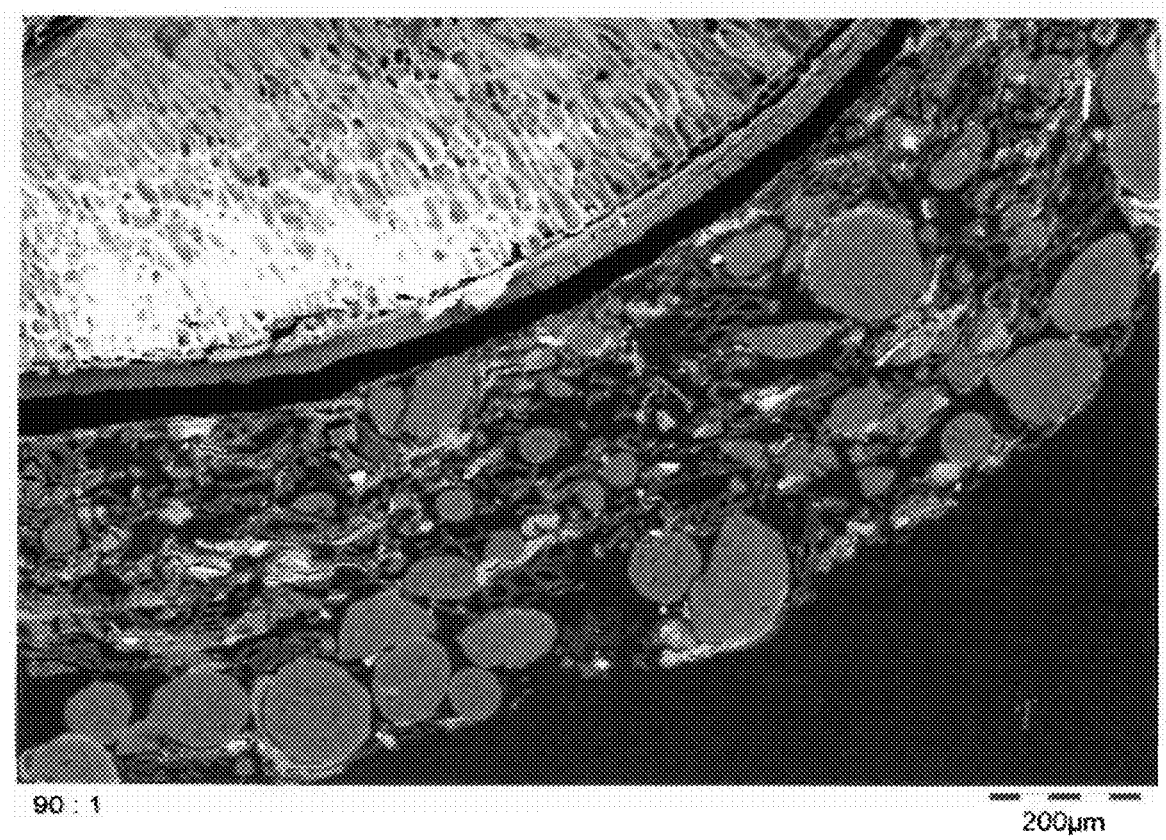
FIG. 1 shows a material-contrast electron micrograph of a seed in accordance with Example 1.

The silicas employed in the examples hereinbelow have the physico-chemical properties shown in Table 1.

TABLE 1

Physico-chemical properties of the silicas employed.

| Product | BET surface [m$^2$/g] | d50 particle size [*] [μm] | Pore maximum [nm] |
|---|---|---|---|
| SIPERNAT ® 22 | 190 | 110 | 43 |
| SIPERNAT ® 350 | 50 | 40 | 50 |
| SIPERNAT ® 360 | 50 | 18 | 48 |
| AEROPERL ® 300/30 | 300 | 33 | 37.5 |

[*] in accordance with ISO 13320-1

Example 1

To produce granulated rapeseed, 300 g of rapeseed are introduced into a granulator (ERWEKA, Germany—composed of the drive unit AR403, universal coupling UG and the pelleting plate GTE, 300 mm diameter). The granulator consists of a revolving pan arranged at an angle of 45° C. and having a diameter of 30 cm and a rotation speed of 40 rpm. With the aid of a nozzle, the seed is sprayed with binder until seed kernels visibly agglomerate. The binder employed is an aqueous solution containing 5% by weight of Mowiol 28-99. Large agglomerates are carefully crushed by hand. Thereafter, coating composition is added. The coating composition employed is a mixture containing 30% by weight of SIPERNAT® 22 and 70% by weight of a basic coating composition. The basic coating composition employed is a mixture of 70% of Lignocel® (cellulose, lignin, hemicellulose) and 30% of Edasil® bentonite. Thereafter, more binder is sprayed on and coating composition is added. In total, 400 g of binder and 200 g of coating composition are added. The coated seed kernels which are being formed are fractionated through a screen of mesh size 3.35 mm and a further screen of 2.8 mm. The finely-particulate fraction is returned to the granulator. The fraction between 2.8 mm and 3.35 mm forms the desired product and is dried in a drying oven at a temperature of 40° C. The moisture content of the dried seed is determined in accordance with ISO 787-2 and is <8%.

Example 2

Granulated seed in which the coating composition contains 70% by weight of SIPERNAT® 22 is prepared as described in Example 1. In total, 500 g of binder and 200 g of coating composition are employed.

Example 3

Granulated seed in which the coating composition contains 30% by weight of SIPERNAT® 350 is prepared as described in Example 1. In total, 363 g of binder and 242 g of coating composition are employed.

Example 4

Granulated seed in which the coating composition contains 30% by weight of SIPERNAT® 360 is prepared as described in Example 1. In total, 327 g of binder and 200 g of coating composition are employed.

Example 5

Granulated seed in which the coating composition contains 70% by weight of AEROPERL® 300/30 is prepared as described in Example 1. In total, 502 g of binder and 237 g of coating composition are employed.

Example 6 (Comparative Example)

Granulated seed in which the coating composition does not contain any silica is prepared as described in Example 1. In total, 301 g of binder and 250 g of coating composition are employed.

Example 7 (Comparative Example)

Granulated seed was prepared as described in U.S. Pat. No. 6,156,699. To this end, 300 g of rapeseed were introduced into a granulator as described in Example 1 and sprayed with a mixture containing 2.7% by weight of polyvinyl alcohol Mowiol 28-99, 0.3% by weight of polysaccharide Elcema F150, 66% by weight of limestone Heladol 150, 0.5% by weight of surfactant Silipon RN 6031, 0.1% by weight of colorant Bayferrox 130, 0.1% by weight of dispersant Break Through DA 646 and 30.3% by weight of water. Thereafter, 10% by weight of SIPERNAT® 22, based on the weight of rapeseed and sprayed-on mixture, were applied and the mixture was granulated for 300 seconds. Thereafter, the product was dried.

Detection of the Silica Distribution in the Coating Layer

To detect the silica distribution in the coating layer, the granules obtained in Examples 1 and 7 were subjected to a scanning-electron examination in connection with energy-dispersive X-ray analysis (EDX).

The following instruments were used for this purpose: microscope from Jeol, type JSM-7600F, EDX system from Oxford Instruments INCA Energy 400 equipped with a PentaFETx3 SiLi detector (resolution 133 eV).

The samples were embedded in an epoxy resin ground metallurgically, and electrical contact was made thereafter. The images were taken at an accelerating voltage of 20 KV and a working distance of 15 mm. The beam current of the primary electron beam was in the range of approximately 500 pA.

Under these conditions, a representative zone of the sample was selected, and a material-contrast image of the sample section was first generated. This visualizes density differences within the sample, but a statement regarding the elements is as yet impossible. To this end, the zone was scanned by the EDX system over a period of 8 h (EDX mapping). The dead time amounted to approximately 30%. Elements of specific distribution images were generated from the spatially-resolved X-ray information obtained.

Figure 2:
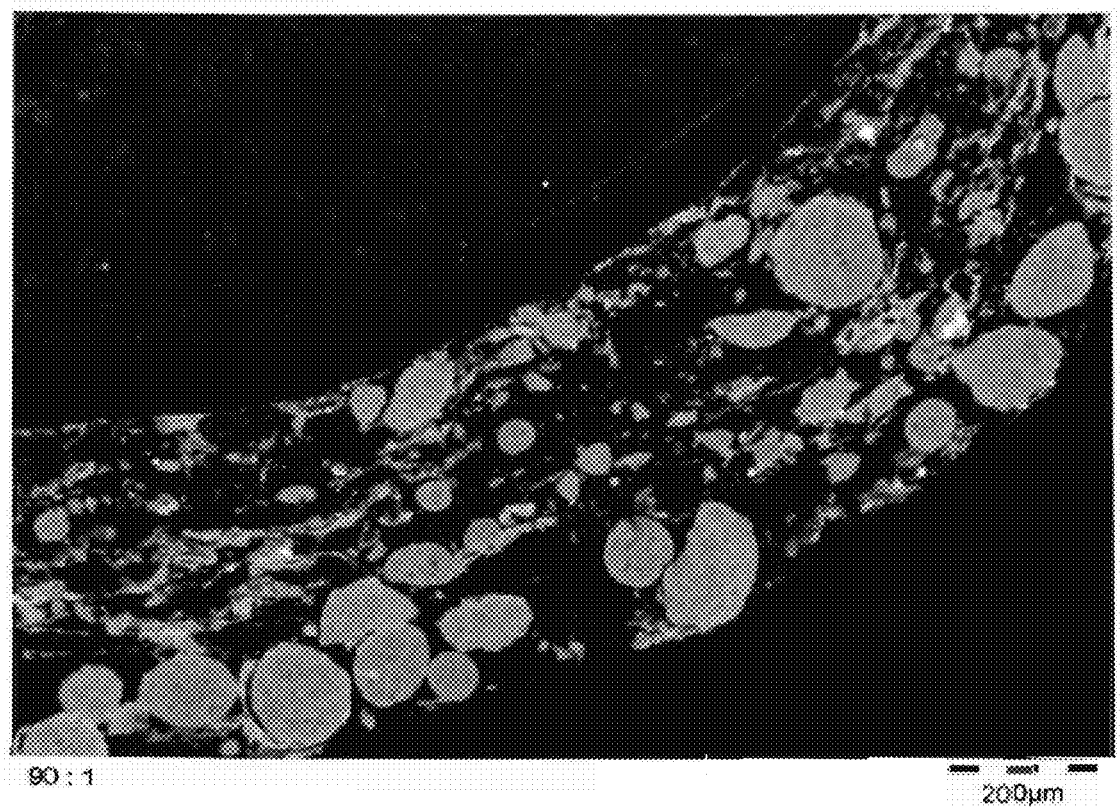
FIG. 2 shows the silicon distribution, determined by EDX, in the seed shown in FIG. 1.
Figure 3:
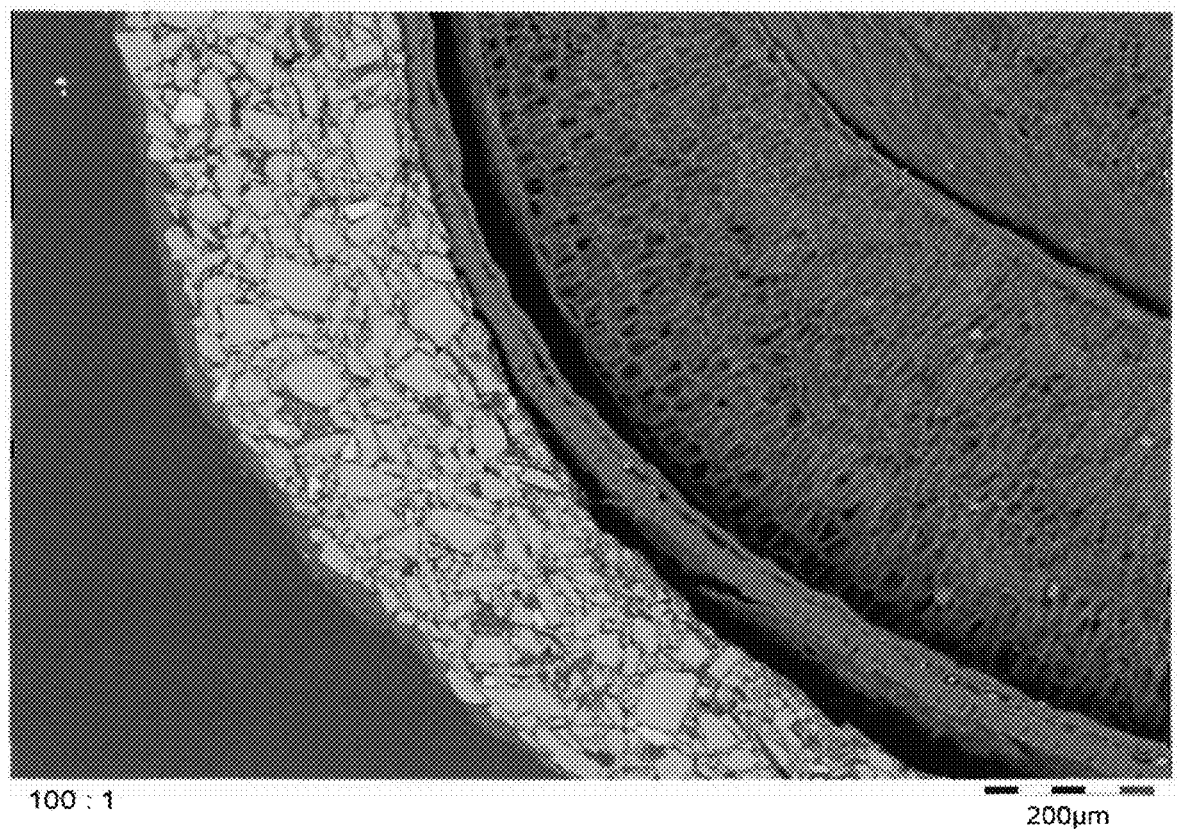
FIG. 3 shows a material-contrast electron micrograph of a seed according to Example 7.
Figure 4:
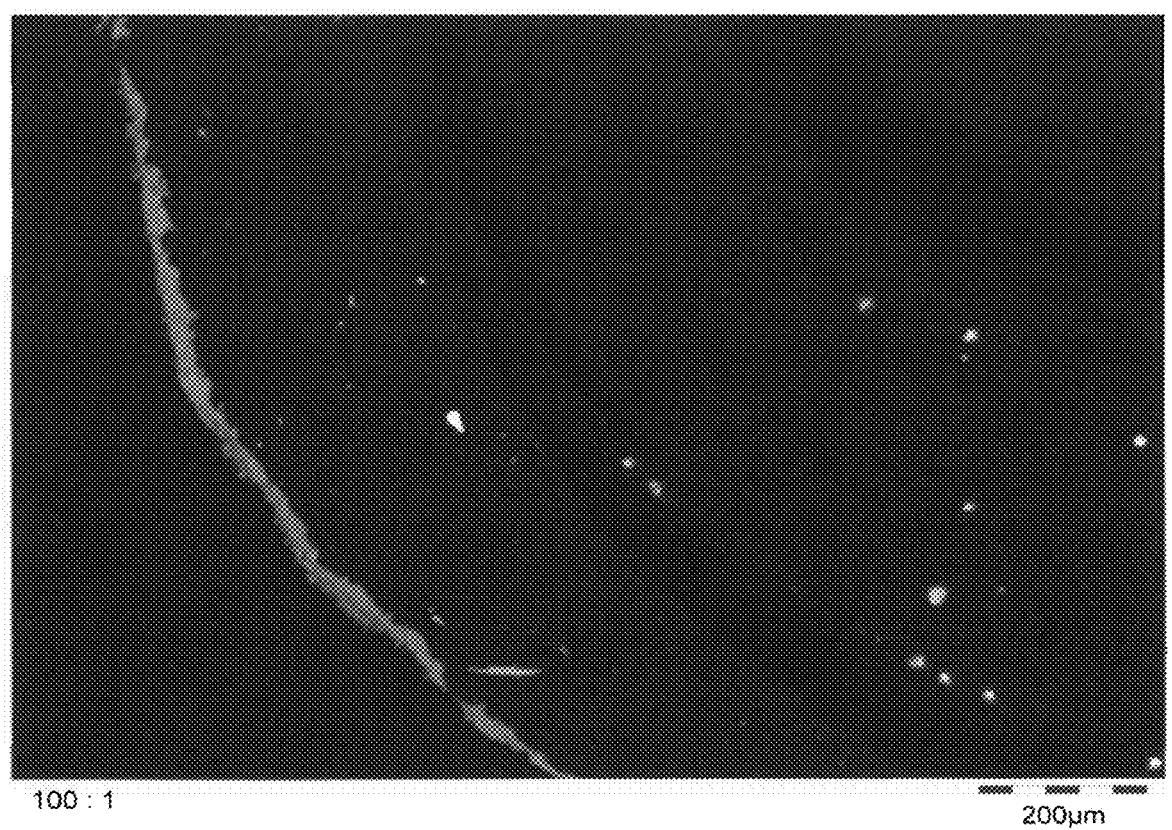
FIG. 4 shows the silicon distribution, determined by EDX, in the seed shown in FIG. 3.

The results of these tests are shown in FIGS. 1 to 4. FIG. 1 shows a material-contrast image of a seed according to Example 1. FIG. 2 shows the distribution of silicon in the same seed as determined by EDX. It can be seen clearly that the silicon is distributed across the entire thickness of the coating layer. FIG. 3 shows a material-contrast image of a seed according to Example 7. FIG. 4 shows the silicon distribution in the same seed as determined by EDX. It can be seen that the silicon is concentrated to a relatively thin layer on the surface of the coating layer compared to the overall thickness of the coating layer.

These results demonstrate that, in a seed granulated in accordance with the invention, the silica is distributed within the entire coating layer, while this is not the case in a seed in accordance with U.S. Pat. No. 6,156,699.

To test for the distribution of silica within the coating layer, the coating layer, which is discernible in the material-contrast image, is divided into an inner and outer shell. To this end, one will first define two straight lines $g_1$ and $g_2$, which connect in each case a point at the inner edge of the coating-layer area to the nearest point of the outer edge of the coating layer and which do not cross each other in the zone of the coating layer. The two points on the inner edge of the coating layer should be selected such that their distance amounts to at least 200 µm. Thereafter, the straight lines $g_1$ and $g_2$ are connected by a line $l_3$, where line $l_3$ extends such that, for each point of line $l_3$, the distance to the nearest point at the inner edge on the coating layer equals the distance to the nearest point on the outer edge of the coating layer. The segment of the coating layer enclosed by the straight lines $g_1$ and $g_2$ is, therefore, divided by the line $l_3$ into an inner zone and an outer zone. The mean silicon concentration within the two zones is determined with reference to the EDX image so as to obtain a measure for the mean silicon concentration in the inner and the outer shell of the coating layer.

Figure 5:
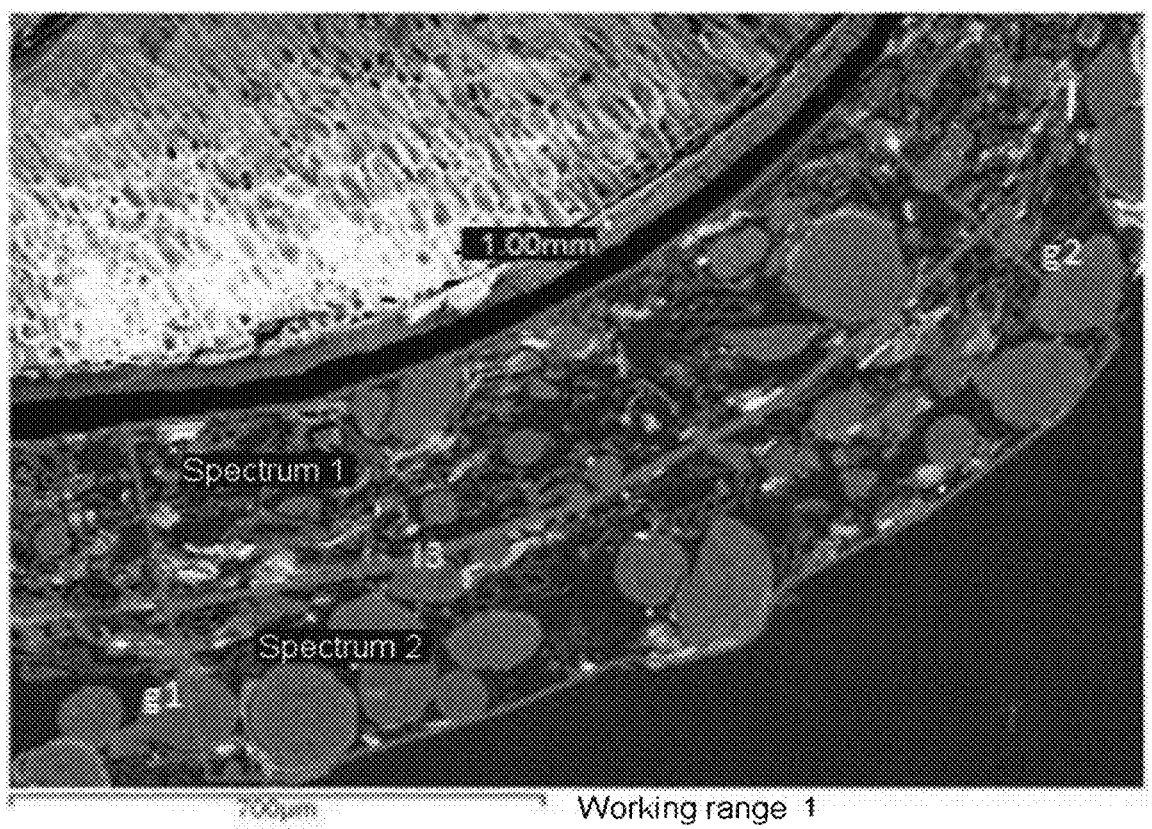
FIG. 5 shows the REM/EDX micrograph of Example 1 in which the coating layer is divided into two coating-layer zones.

FIG. 5 shows the REM/EDX image of Example 1 in which the coating layer is divided into two coating-layer zones. To analyse the silicon of the silica, the silicon content of the bentonite in the two zones was subtracted from the total silicon concentrations of spectrum 1 and 2, respectively. Accordingly, spectrum 1 has a silica concentration of 24.8% and spectrum 2 a silica concentration of 35.2%. The difference in the silica concentration is 10.4%.

Determination of the Hardness

The hardness of the granulated seed is carried out using a texture analysis instrument (Texture Analyser TA.XTplus from Stable Micro Systems, Germany). The principle of the measurement is, using a cylindrical measuring element 25 mm in diameter, to apply a pressure to a granule, the pressure with which the measuring element acts on the granule increasing until the shell of the granule bursts. The maximum force measured in kg is a measure for the hardness of the granule. 10 samples are measured per experiment so as to obtain a mean.

The hardness determined for the individual examples of granulated seed compositions is shown in Table 2.

Determination of the Abrasion Resistance

The abrasion resistance of the granulated seed is carried out with a friability tester (TAR 120 from Erweka, Germany). The drum of the testing instrument is charged with 20 g of granulated seed, and the seed is agitated in the drum at 40 rpm for 5 minutes. Thereafter, the seed is fractionated through an 800 µm screen, and the weight of the coarse-grained fraction is determined. The weight lost as a result of abrasion is the difference between the weight of the introduced seed and the weight of the coarse-grained fraction. The percentage abrasion based on the starting weight is a measure for the abrasion resistance.

The abrasion determined for the individual examples of granulated seed compositions is shown in Table 2.

Determination of the Disintegration Time in Water

The disintegration time in water, of the granulated seed, is determined in a ZT 31-type instrument (Erweka, Germany). For each experiment, two granules are immersed in a water bath which has a constant temperature of 14.8 to 15.2° C. The time which elapses until the coating of the granules has become fully detached from the seed kernel is a measure for the disintegration time. The measurement is terminated after a maximum of 60 minutes.

The disintegration time in water determined for the individual examples of granulated seed compositions is shown in Table 2.

Determination of the Germination Ability

To determine the germination ability of the granulated seed, 100 granules are placed into the pleats of a pleated paper (Hahnemühle, Dassel, accordion-pleated strips 110/20 mm, No. 3140). The pleated paper is transferred into a plastic dish (length×width×height: 170 mm×125 mm×60 mm) which is lined with a triple piece of folded filter paper strip (Hahnemühle, Dassel, wrapping strip 110/580 mm, No. 0585). The pleated paper is moistened uniformly with 35 m l of tap water. The dish is sealed tightly and stored at 20° C. After three days, the proportion of germinated seeds and of abnormal seedlings is determined. Abnormal seedlings are damaged seedlings, deformed seedlings or seedlings with uneven development, or seedling which show signs of rot. Abnormal seedlings were identified by shortened roots, deformed or discoloured leaves or seedlings whose root tips show signs of black discoloration. Each measurement is repeated four times.

The germination ability of clean rapeseed (winter oilseed rape variety Dimension, thousand-seed weight 6.3 g) is determined by way of comparison.

The germination ability determined for each of the examples of granulated seed composition is shown in Table 3. The results demonstrate that seed granulated with the aid of silica has a higher germination ability after three days than granulated seed without silica and has similarly a high germination ability as non-granulated, clean rapeseed.

TABLE 2

Hardness, abrasion and disintegration time in water of individual granulated seed compositions.

| Example | Hardness (kg) | Abrasion (%) | Disintegration time (min) |
|---|---|---|---|
| 1 | 1.848 | 2.88 | >60 |
| 2 | 1.491 | 2.83 | >60 |
| 3 | 1.573 | 1.9 | >60 |
| 4 | 1.47 | 2.05 | >60 |
| 5 | 1.947 | 1.38 | >60 |
| 6 | 1.967 | 1.63 | >60 |

TABLE 3

Germination ability of individual granulated seed compositions.

| Example | Germination ability after 3 days (%) | Abnormal seedlings (%) |
|---|---|---|
| 1 | 86.5 | 3.25 |
| 2 | 84.25 | 3.5 |
| 3 | 82.25 | 5 |
| 4 | 80.25 | 3.25 |
| 5 | 80.5 | 4.75 |
| 6 | 77 | 5.25 |
| Clean rapeseed | 85.75 | 3 |

The invention claimed is:

1. A granulated seed, comprising:
a seed, which is not a seed of tomato, cucumber, carrot, spinach, onion, or sugarbeet; and a coating layer coating the seed,
wherein the coating layer comprises:
(i) at least one non-silica inorganic or organic filler;
(ii) silica in an amount of 10% to 70% by weight based on a weight of the coating layer and in an amount of 20% to 55.3% by weight based on a weight of the seed; and
(iii) a binder,
wherein the silica has a surface area ranging from 20 to 190 $m^2/g$ and is uniformly distributed in the coating layer, and
wherein the granulated seed exhibits at least 80.25% of germination ability when stored at 20° C. for three days on a paper moistened with water.

2. The granulated seed of claim 1, wherein the coating layer comprises the silica in an amount ranging from 20% to 45% based on the weight of the coating layer.

3. The granulated seed of claim 1, wherein a difference between an amount of the silica in an inner part of the coating layer and an amount of the silica in an outer part of the coating layer is not more than 50% by weight; wherein the inner part is a part of the coating layer lying directly on the seed to enclose the seed when the coating layer is divided into two equally thick shells, and the outer part is a remaining part of the coating layer lying outside the inner part to enclose the inner part.

4. The granulated seed of claim 1, wherein a difference between an amount of the silica in an inner part of the coating layer and an amount of the silica in an outer part of the coating layer is not more than 15% by weight; wherein the inner part is a part of the coating layer lying directly on the seed to enclose the seed when the coating layer is divided into two equally thick shells, and the outer part is a remaining part of the coating layer lying outside the inner part to enclose the inner part.

5. The granulated seed of claim 1, wherein the silica is precipitated or pyrogenic silica that has a pore maximum ranging from 30 to 60 nm.

6. The granulated seed of claim 1, wherein the silica is precipitated or pyrogenic silica that has the surface area ranging from 50 to 190 $m^2/g$ and a pore maximum ranging from 35 to 50 nm.

7. The granulated seed of claim 1, wherein the at least one non-silica inorganic or organic filler comprises a mixture of cellulose, lignin, and hemicellulose.

8. The granulated seed of claim 1, wherein the binder is selected from the group consisting of at least one polyvinyl alcohol, a polycarboxylate, a polyacrylic acid, a polysaccharide, a cellulose, a carboxymethylcellulose, an acrylic dispersion, a polymethacrylate, a polyvinyl acetate, a polyethylene oxide, an alkyl acrylate, a gelatin, a starch, an alginate, a casein, a molasses, a pectin and a mixture thereof.

9. The granulated seed of claim 1, wherein the binder comprises polyvinyl alcohol.

10. The granulated seed of claim 1, wherein the coating layer further comprises a hygroscopic salt in an amount ranging from 0.1% to 15% by weight of the coating layer.

11. The granulated seed of claim 1, wherein the seed is 0.3 mm to 10 mm in size.

12. The granulated seed of claim 1, wherein the seed is rapeseed having a size ranging from 2.0 to 3.6 mm.

13. The granulated seed of claim 1, consisting of the seed and the coating layer.

14. The granulated seed of claim 1, wherein the seed is a seed of Brassicaceae, Legumes, Leguminosae, catch crops, cereals, ornamentals or tobacco.

15. The granulated seed of claim 1, wherein the seed is a seed of Brassicaceae.

16. A method for improving germination of a granulated seed, comprising:
coating a seed with a composition comprising at least one non-silica inorganic or organic filler, silica, and a binder, thereby forming a coating layer coating the seed,
wherein the seed is not a seed of tomato, cucumber, carrot, spinach, onion, or sugarbeet,
wherein the silica is in an amount of 10% to 70% by weight based on a weight of the coating layer and in an amount of 20% to 55.3% by weight based on a weight of the seed,
wherein the silica has a surface area ranging from 20 to 190 $m^2/g$ and is uniformly distributed in the coating layer, and
wherein the seed coated by the coating layer exhibits at least 80.25% of germination ability when stored at 20° C. for three days on a paper moistened with water.

17. A method for making a coated seed, comprising:
mixing a seed with a coating composition comprising:
(i) at least one non-silica inorganic or organic filler;
(ii) silica; and
(iii) at least one liquid binder,
such that the seed is coated by a coating layer,
wherein the silica is in an amount of 10% to 70% by weight based on a weight of the coating layer and in an amount of 20% to 55.3% by weight based on a weight of the seed,
wherein the seed is not a seed of tomato, cucumber, carrot, spinach, onion, or sugarbeet,
wherein the silica has a surface area ranging from 20 to 190 $m^2/g$ and is uniformly distributed in the coating layer, and
wherein the coated seed exhibits at least 80.25% of germination ability when stored at 20° C. for three days on a paper moistened with water.

18. The method of claim 17, further comprising:
separating and recovering the coated seed that is within 1.5-fold to 2.5-fold a mean seed size.

19. The method of claim 17, wherein the seed is rapeseed having a size ranging from 2.0 to 3.6 mm.

* * * * *